United States Patent [19]

Alexander et al.

[11] Patent Number: 4,792,372

[45] Date of Patent: Dec. 20, 1988

[54] AUTOMATIC SIDEWALL SERVICER

[75] Inventors: Joseph H. Alexander; Stanley L. Radcliffe; Martin N. Robertson, all of Summit County; Eugene A. Bator; John E. Anderson, both of Portage County, all of Ohio

[73] Assignee: General Tire, Inc., Akron, Ohio

[21] Appl. No.: 77,705

[22] Filed: Jul. 24, 1987

[51] Int. Cl.⁴ .......................................... B29C 30/08
[52] U.S. Cl. ............................. 156/394.1; 156/405.1; 156/406.4; 156/580.1; 198/820; 428/157; 428/192; 428/494; 428/518; 428/36.6; 428/36.8
[58] Field of Search .................. 156/73.3, 580.1, 580.2, 156/394.1, 396, 405.1, 406 A, 408, 409, 410, 411, 413, 414, 421, 408.1; 428/192, 358, 36, 35, 156, 157, 494, 518; 198/820, 821

[56] References Cited

U.S. PATENT DOCUMENTS

| | | | |
|---|---|---|---|
| 495,795 | 4/1893 | Gates | 198/821 |
| 1,557,891 | 10/1925 | Stevens | 156/410 |
| 1,645,397 | 10/1927 | Perrault | 156/411 |
| 2,035,422 | 3/1936 | Breth et al. | 156/413 |
| 2,918,105 | 12/1959 | Harris | 156/395 |
| 3,775,220 | 11/1973 | Rattray | 156/409 |
| 3,788,799 | 1/1974 | Levi | 198/821 |
| 3,841,941 | 10/1974 | LeBlond et al. | 156/405.1 |
| 3,852,142 | 12/1974 | LeBlond et al. | 156/396 |
| 4,222,811 | 9/1980 | Enders | 156/405.1 |
| 4,448,627 | 5/1984 | Satoh et al. | 156/405.1 |
| 4,457,802 | 7/1984 | Yanagihara et al. | 156/405.1 |
| 4,465,536 | 8/1984 | Makino et al. | 156/405.1 |
| 4,470,866 | 9/1984 | Satoh et al. | 156/411 |
| 4,584,217 | 4/1986 | McClintock . | |
| 4,617,074 | 10/1986 | Portalupi et al. | 156/405.1 |
| 4,623,420 | 11/1986 | Hinkley | 156/73.3 |
| 4,711,693 | 12/1987 | Holze | 156/73.3 |

FOREIGN PATENT DOCUMENTS

| | | | |
|---|---|---|---|
| 573664 | 4/1959 | Canada | 198/820 |
| 3119135 | 12/1982 | Fed. Rep. of Germany | 156/405.1 |
| 3513238 | 10/1986 | Fed. Rep. of Germany | 156/406.4 |
| 1070222 | 7/1954 | France | 198/821 |
| 1354982 | 2/1964 | France | 198/820 |
| 82977 | 4/1964 | France | 198/1821 |
| 749208 | 5/1956 | United Kingdom . | |
| 2108060 | 5/1983 | United Kingdom | 156/405.1 |

OTHER PUBLICATIONS

Morris, Ed., The American Heritage Dictionary, p. 1332.

Primary Examiner—Willard Hoag

[57] ABSTRACT

A servicer is described for supplying two cut-to-length strips of sidewall simultaneously to a tire building drum without handling by the tire builder, thereby eliminating any stretching of the sidewalls or distortion of the shape of the sidewalls which can happen when the sidewalls are physically handled by the tire builder. The servicer employs twin cassettes which contain two spools of spirally wound sidewall which is separated by a comparatively rigid, U-shaped protective liner.

The servicer has an indexing table for moving twin cassettes from a standby position to a let-off position to a take-up position and, lastly, to a removal position where the cassette is removed for rewinding with new material.

A robotic grabber is provided to engage the leading edges of liners on a let-off cassette and move them to the rear of the servicer where the operator threads the liners onto a take-up cassette and the sidewall onto a pair of overhead belt-type conveyors for transportation of a discharge tray which is mounted on the front end of the servicer for rotation to and from an adjacent tire building drum.

The discharge tray carries a mechanism for cutting the sidewall, to length, and a device for finally aligning the cut sidewall for passage from the tray onto the sidewall area of an unvulcanized tire carcass being built on the drum.

25 Claims, 8 Drawing Sheets

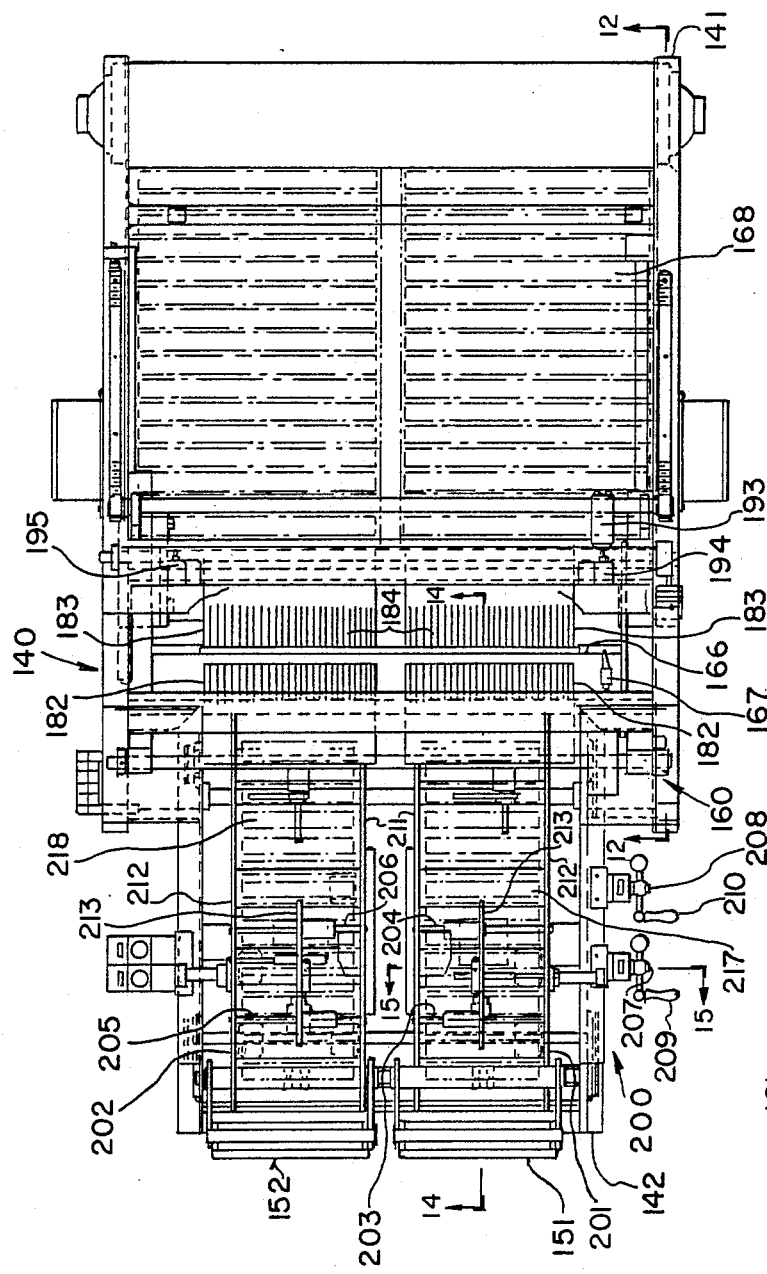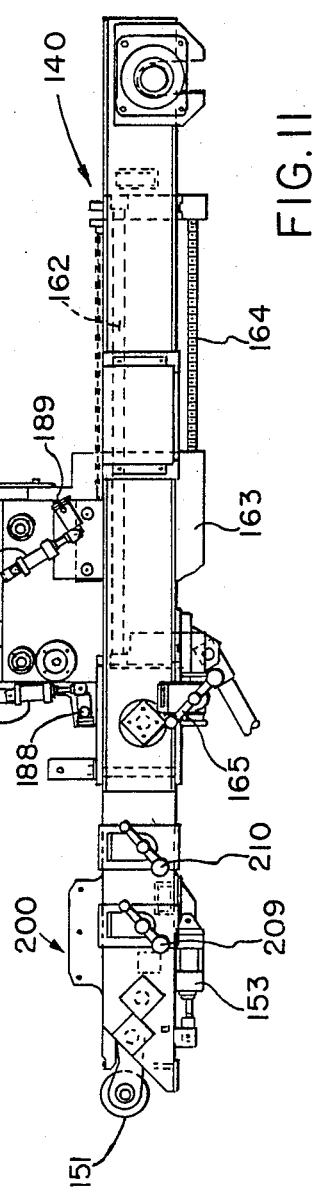

AUTOMATIC SIDEWALL SERVICER

BACKGROUND OF INVENTION

The invention relates to tire building machinery, especially servicers which are used to store and supply unvulcanized rubber sidewall stock to an operator who is building an unvulcanized tire on a tire building drum.

At present, sidewall stock is formed, cut-to-length, and stored in horizontal trays which are separated from each other to prevent damage to the shape of the stock. The tire builder removes two pieces of stock from the trays of the servicer and applies them, by hand, to the unvulcanized, cord reinforced tire carcass being built on the tire building drum. Frequent handling of the unvulcanized stock causes stretching and distortion of the rubber, so that a serious hump can be formed in the sidewall by a piece of overly stretched stock. The hump produces a pocket in which air becomes trapped to adversely affect adhesion between the stock, and adjacent components of the tire.

The invention is designed to provide a cut-to-length piece of sidewall stock which is immediately applied to the tire building drum without handling by the operator, thereby eliminating or substantially reducing any distortion of the unvulcanized rubber stock, prior to its use in the tire building process.

SUMMARY OF INVENTION

Briefly stated, the invention is in a sidewall servicer and a cassette which employs twin spools on which separate strips of sidewall and U-shaped protective liners are spirally wrapped.

The servicer comprises an indexing table for moving twin cassettes to different positions on the servicer. A pair of robotic grabbers are provided for grasping leading edges of the liners and moving them to positions where an operator can grab the liners and separate from them, the strips of stock for threading on an overhead conveyor which transports the stock to a discharge tray where the strips of stock are cut, to length, and then properly aligned for passage onto a tire building drum which is adjacent the discharge end of the tray.

DESCRIPTION OF DRAWING

The following description of the invention will be better understood by having reference to the accompanying drawing of the following figures in which certain portions have been removed to clarify the description of the invention.

FIG. 10 is an enlarged plan view of the discharge tray;

FIG. 11 is a side view of the tray;

DETAILED DESCRIPTION OF DRAWING

Figure 1:
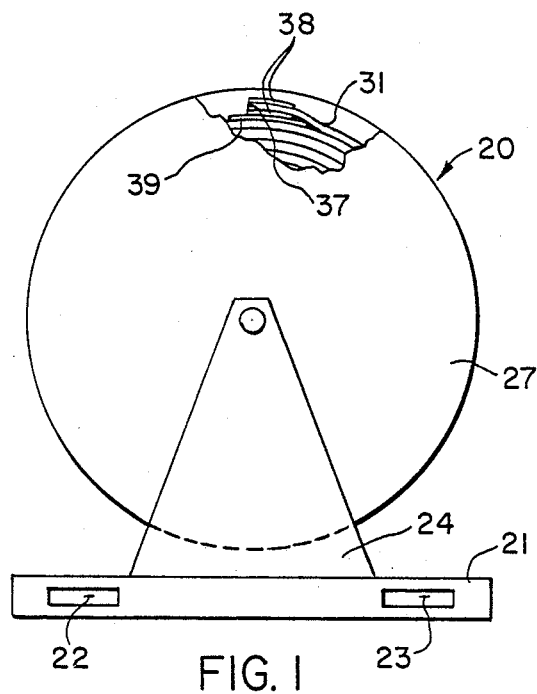
FIG. 1 is a side view of a twin cassette.

With general reference to the drawing for like parts, and specific reference to FIGS. 4–7, there is shown a servicer 17 which is placed adjacent a tire building drum 18 to supply cut-to-length unvulcanized rubber strips of whitewall and blackwall stock 19 to the drum 18 for application on an unvulcanized tire carcass being built on the drum 18.

The servicer 17 essentially comprises: a twin cassette 20 for holding the whitewall and blackwall stock 19; a rigid framework 40; an indexing table 60 on which four twin cassettes 20 can be positioned; a robotic grabber 80 for facilitating threading of the stock 19 in the servicer 17; a device 100 for initially aligning the stock 19 for subsequent passage through the servicer 17; an overhead conveyor 120 for transporting the stock 19 a predetermined distance to relax stress built-up in the stock 19 during coiling of the stock 19 on the twin cassette 20; a discharge tray 140 from which stock 19 exits the servicer 17; a device 160 for cutting stock 19 on the discharge tray 140, to length; and a mechanism 200 for finally aligning the strips of whitewall and blackwall stock 19 for passage to the tire building drum 18.

Twin Cassette and Liner

Figure 2:
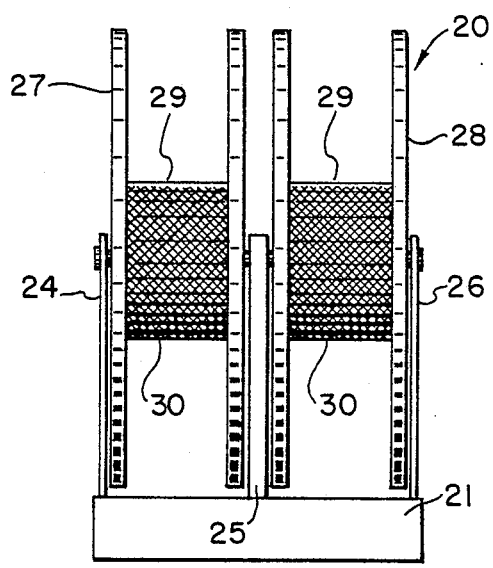
FIG. 2 is an end view of the twin cassette.

With reference to FIGS. 1 and 2, there is shown a twin cassette 20 which comprises a rectangular metal base 21 which has two aligned and spaced openings 22, 23 which are sized to receive the outstanding forks of a conventional fork lift truck. Three rigid stanchions 24, 25, 26 extend vertically from the base 21 in parallel relation, when the base 21 is horizontal. A pair of identical reels or spools 27, 28 are journaled between the stanchions 24, 25 and 25, 26 for rotating freely in parallel planes about the same axis. Each of the spools 27, 28 has a cylindrical core 29 around which is secured, for example, the first part 30 of a two-part velcro-type fastener.

Figure 3:
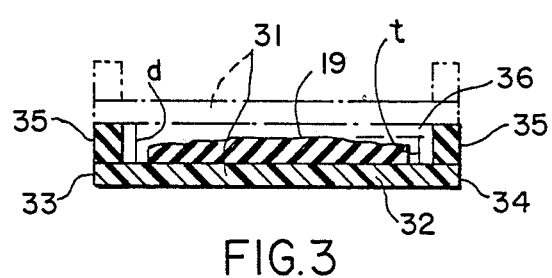
FIG. 3 is a cross-section of the liner.

With reference to FIG. 3, there is shown a U-shaped liner 31 for protecting the shape of a piece of unvulcanized rubber sidewall stock 19. The liner 31, in cross-section, comprises a planar web 32 which has a pair of parallel marginal edges 33, 34. A pair of similar projections 35 extend from the marginal edges 33, 34 a distance d which is greater than the greatest thickness t of the sidewall stock 19. The web 32 is composed of a rigid material, preferably polyvinylchloride having a textured surface to which the unvulcanized rubber sidewall stock will not adhere. In constrast to the rigid web 32, the projections 35 are formed of a more compressible material, preferably an elastomer such as a rubber. It can be appreciated from FIG. 3, that the spirally wrapped layers of liner 31 form a spirally oriented recess 36 in which the sidewall stock 19 can safely rest.

The roll of liner 31 and stock 19 is kept from unraveling by providing the outermost leading edge 37 of the liner 31 with, for example, the second part 38 of a two-part Velcro-type fastener for detachable securement to the first part 39 of such fastener which is secured to the next underlayer of liner 31 adjacent the leading edge 37. The fastener at the leading edge 37 of the liner 31 can also be attached to the core 29 of a spool 27, 28. The stock 19 is terminated short of the leading edge 37 of the liner 31, so that the leading edge 37 can be picked up and threaded on an empty cassette without injuring the sidewall stock 19.

Servicer Framework

With reference to FIGS. 4-7, there is shown the servicer 17 which comprises a rigid metal framework 40 which is bolted to a horizontal floor 41 in adjacent, aligned relation with the tire building drum 18. A safety switch in the form of a mat 42 on which the operator stands as he builds the unvulcanized tire carcass on the building drum 18, is provided between the drum 18 and acjacent vertical front frame 43 of the servicer 17 to prevent operation of the servicer 17, until the operator moves from the mat to alongside the framework 40 and a main control panel 44 to begin operation of the servicer 17, when the tire carcass is ready for receipt of the sidewall stock 19. The framework 40 has a rear frame 45 which is vertically disposed in spaced relation from the front frame 43.

A motor 46 is operatively connected by means of a gear box 47 to a drive roll 48 which is pivotally mounted on the front and rear frames 43, 45 for rotation into and out of driving engagement with the rims 49 of adjacent spools 27, 28 of twin cassettes 20 in the let-off and take-up positions LP, TP, by means of pneumatic or hydraulic cylinders 50. There are four drive rolls 48 which are programmed for synchronized rotation about axes which are parallel to the rotational axis of the tire building drum 18 and normal to the direction of travel of the liner 31 and stock 19.

A plurality of guide rolls 51, 52, 53 (FIG. 4) are strategically located adjacent either side of the framework 40 to direct liner 31 and stock 19 towards the rear frame 45. The guide rolls 51, 52, 53 are mounted for rotating freely about axes which are also parallel to the rotational axis of the tire building drum 18.

Indexing Table

Figure 8:
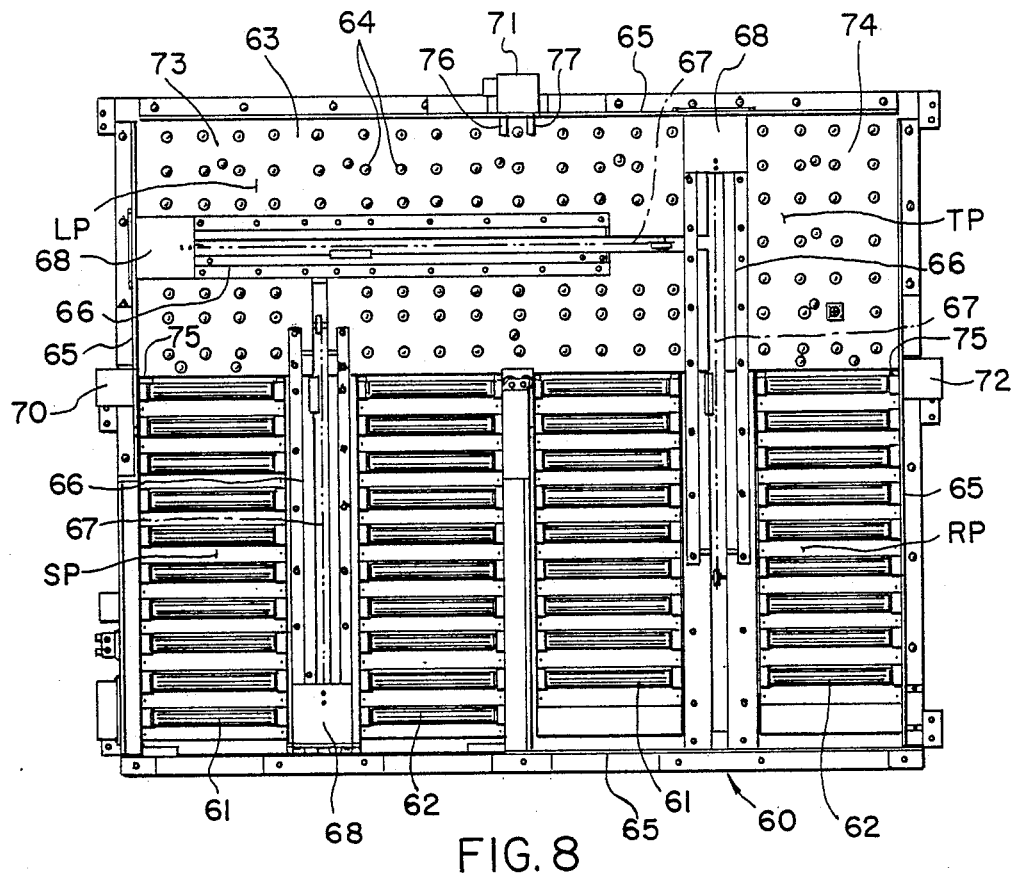
FIG. 8 is a plan view of the indexing table, as seen from the line 8—8 of FIG. 4.

With reference to FIGS. 1 and 8, there is shown the rectangular skid shifter or indexing table 60 which is bolted to the floor 41 within the framework 40. If desired, the framework 40 can be provided with framing to facilitate positioning of the indexing table 60 which is designed to support four twin cassettes 20 simultaneously, and sequentially move them from an on-deck or standby position SP, to a let-off position LP, to a take-up position TP, and lastly to a removal position RP where the cassettes 20 are removed from the servicer 17.

A pair of similar horizontal roller conveyers 61, 62 are used to support a cassette 20 in the standby and removal positions SP, RP, and for conveying the cassette 20 to the let-off position LP and from the take-up position TP, respectively. A platform 63 with multi-directional, freely rotatable metal ball transfers 64 are used to support a cassette 20 in the let-off and take-up positions LP, TP and convey the cassette 20 to and from these positions.

An outer rim 65, in the form of a metal angle with an upstanding flange, surrounds the conveyors 61, 62 and platform 63 and acts as an abutment against which the base 21 of the cassette 20 is clamped in the let-off and take-up positions LP, TP.

Similar drive mechanisms 66 are used to push the cassettes 20 between the various positions. In each case, the drive mechanism 66 includes a motor (not shown) which is operatively connected by means of a drive chain 67 to an L-shaped pusher plate 68 which is designed to engage and push the base 21 of each cassette 20. A drive mechanism 66 is centered between the conveyors 61, 62 in the standby and removal positions SP, RP and is centered in the platform 63 in the let-off and take-up positions LP, TP. Note that in the let-off and take-up positions LP, TP, a portion of the outer rim 65 is removed to accomodate the receipt of the upstanding flange 69 of the pusher plate 68.

Diagonally opposed clamping devices 70, 71, 72 are used to clamp cassettes 20 in the corners 73, 74 formed by the rim 65 in the let-off and take-up positions LP, TP. The opposing clamping devices 70, 72 closest the roller conveyors 61, 62, each have a bar-shaped clamp 75 which is retractable out of interfering relation with movement of the cassettes 20 to the let-off and removal positions LP, RP, and which is movable to and from opposite portions of the rim 65, when the bar clamps 75 are fully extended towards each other. The remaining clamping device 71, which is diagonally opposed to the other two clamping devices 70, 72 has two, similar outstanding parallel bar clamps 76, 77 which are also retractable out of interfering relation with movement of the cassettes 20 on the ball transfers 64, and which are reciprocable to and from each other to engage the bases 21 of cassettes 20 in the let-off and take-up positions LP, TP, and together with the other bar clamps 75, lock the let-off and take-up cassettes 20 in the corners 73, 74.

In operation, assuming there are cassettes 20 clamped in the let-off and take-up positions LP, TP, and a cassette 20 is in the standby position SP, the first set of bar clamps 75, 77 in the take-up position TP are retracted, so that the associated pusher plate 68 can be activated to push the adjacent cassette 20 from the take-up position TP to the removal position RP. Upon return of the pusher plate 68 to its rest position, the second set of bar clamps 75, 76 in the let-off position are retracted, so that the second associated pusher plate 68 can be activated to push the adjacent cassette 20 from the let-off position LP to the take-up position TP where it is clamped in place. Upon return of the second pusher plate 68 to its rest position, the third pusher plate 68 in the standby position SP is activated to push the fully loaded, standby cassette 20 into the let-off position LP where it is immediately clamped in place. The spent cassette 20 in the removal position RP is taken away for reloading, and a fully loaded fresh cassette 20 is placed in the standby position SP on the indexing table 60. Thus, the operation of moving cassettes 20 to and from the most important let-off and take-up roll positions LP, TP, is continuous and as uninterrupted as possible.

Robotic Grabber

Figure 4:
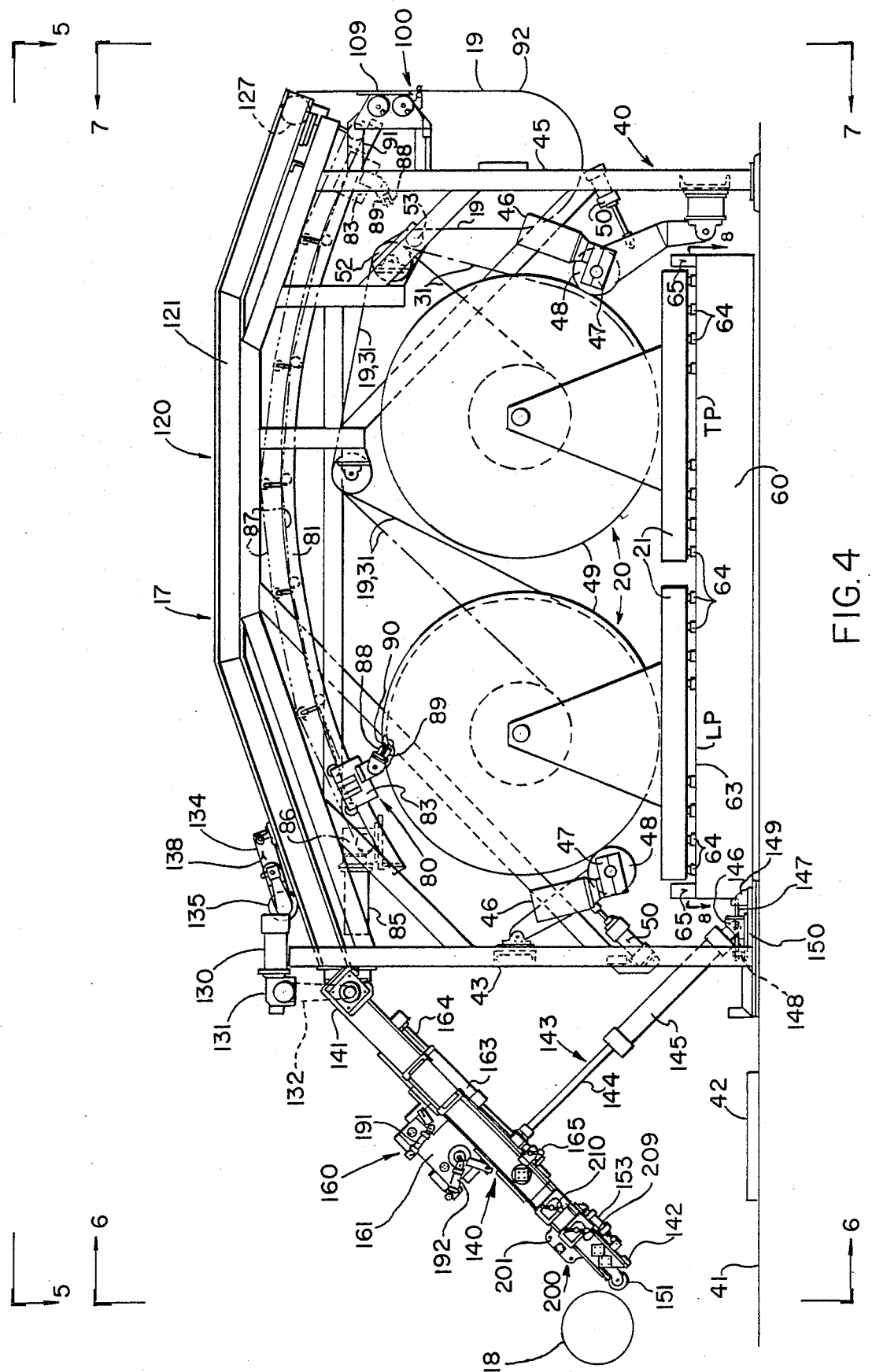
FIG. 4 is a side view of a servicer of the invention.
Figure 7:
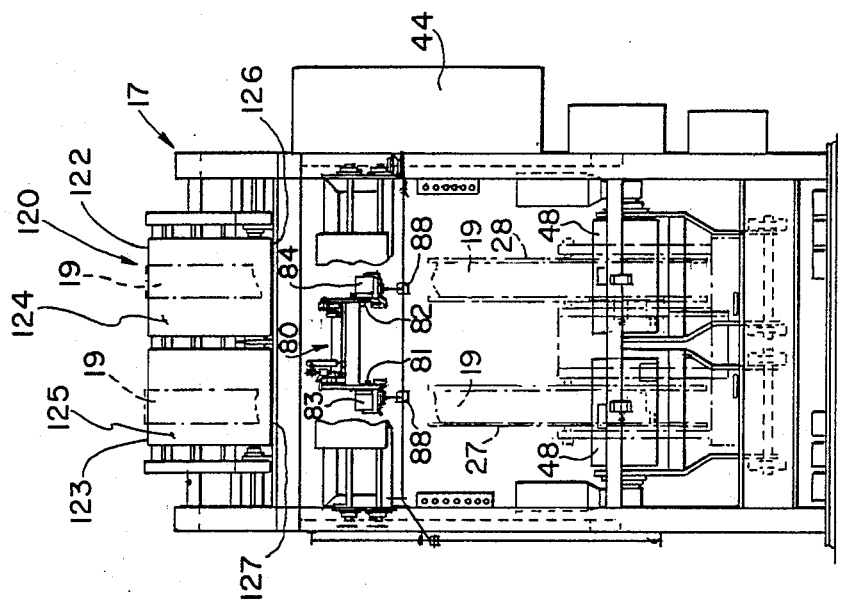
FIG. 7 is a rear view of the servicer, as seen from the line 7—7 of FIG. 4.

With reference to FIGS. 4 and 7, there is shown the robotic grabber 80 which comprises a pair of trackways 81, 82 which are mounted in parallel relation on the framework 40 in overhead relation above, and centrally aligned with, cassettes 20 in the let-off and take-up positions LP, TP.

A pair of similar, wheeled trolleys 83, 84 are movable along the trackways 81, 82 from a rest position adjacent the cassette 20 in the let-off position LP, i.e. the so-called let-off roll, to a position, shown in dotted line, beyond the cassettes 20 in the take-up position TP, i.e. the take-up roll. A motor 85 is operatively coupled by means of a gear box 86 and drive chain 87, to each of the trolleys 83, 84 for moving the trolleys 83, 84 back and forth along the trackways 81, 82.

A pair of jaws 88, 89 are pivotally mounted on each of the trolleys 83, 84 so that they can be rotated from a first position where they are poised to grasp the leading edge 37 of liner 31 on the let-off roll, to a second let-go position, shown in dotted line, where the leading edge 37 of liner 31 is free to exit the jaws 88, 89. The jaws 88, 89 are spaced apart to frictionally engaged and hold the leading edge 37 of the liner 31 as the associated trolley 83, 84 moves rearwardly along the trackway 81, 82 towards the rear frame 45 of the servicer 17. A limit switch 90 is located between each pair of jaws 88, 89 to signal operation of the trolleys 83, 84 when the leading edges 37 of the liners 31 are firmly within the grasp of the jaws 88, 89. Another limit switch 91 at the opposite end of each of the trackways 81, 82 is provided to stop operation of the trolleys 83, 84 and subsequently return them to their rest positions for future pick-up of another liner 31. Notice that the liner 31 will fall, by gravity, over the aligned guide rolls 51, 52 as the leading edge 37 of the liner 31 is carried rearwardly by the jaws 88, 89.

An operator, standing at the rear 45 of the servicer 17, removes the leading edge 37 of each liner 31 from the jaws 88, 89 and threads them over the guide rolls 52, 53 for securement to the core 29 of the aligned take-up roll by means of the Velcro-type fasteners 30, 38. The sidewall stock 19, separated from the liner 31, is threaded over the adjacent guide roll 53 and then formd in a loop or festoon at 92, prior to passage upwards to the initial aligning device 100.

Initial Aligning Device

Figure 9:
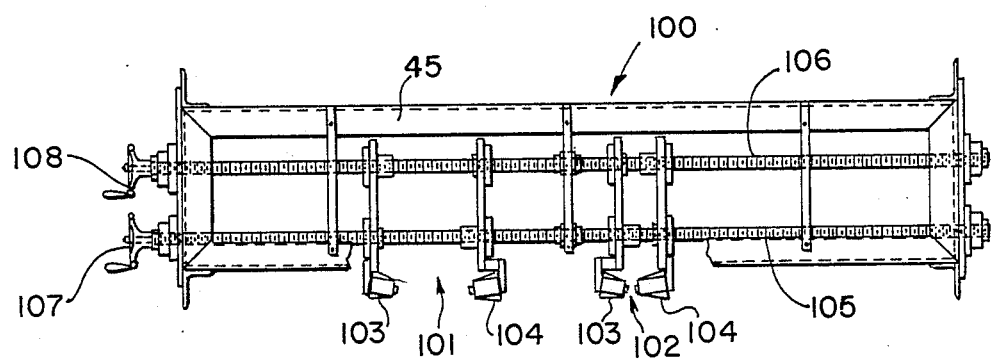
FIG. 9 is an enlarged end view of the initial sidewall stock aligning device which is at the rear end of the servicer.

With reference to FIGS. 1 and 9, there is shown the initial aligning device 100 which comprises two pairs 101, 102 of similar but oppositely disposed, freely rotatable conically shaped rollers 103, 104 for rollingly engaging opposing marginal edges of the two pieces of sidewall stock 19. The inwardly conical shape of the rollers 103, 104 of each pair of rollers acts to keep the stock 19 between them and prevent the stock from straying laterally beyond the pathway defined by the two opposing pairs or sets of rollers. The positions of the rollers are not accurately portrayed in FIG. 9, but are designed to show that the lateral position of each pair of rollers can be varied as well as the spacing between the rollers of each pair.

For example, there are two parallel drive screws 105, 106 provided transversely of the rear frame 45. The drive screws 105, 106 are coupled to handles 107, 108 for manually rotating the drive screws 105, 106 independently of each other. As seen in FIG. 9, the closest conical rollers 104, 103 of the two pairs 101, 102 of rollers, are threadably engaged with the lowermost drive screw 105 and slidable mounted on the uppermost drive screw 106 shich acts as a guide rod in this instance. Conversely, the farthest spaced conical rollers 103, 104 of the two pairs 101, 102 of rollers, are threadably engaged with the uppermost drive screw 106 and slidably mounted on the lowermost drive screw 105 which also acts as a guide rod. Thus, the combination of guide rods and drive screws stabilizes the roller assemblies to maintain the conical guide rollers 103, 104 of each pair 101, 102 firmly, in position, for guiding the sidewall stock 19 onto the overhead conveyor 120. A flat splice plate 109 is vertically aligned above each of the pairs 61, 102 of guide rollers 103, 104, to provide a rigid surface against which splices can be made between leading and trailing edges of sidewall stock 19.

Overhead Conveyor

With reference to FIGS. 4–7 there is shown the overhead conveyor 120 which comprises a structural frame 121 which is rigidly braced and which is secured to the framework 40 in overhead relation above the trolley trackways 81, 82. As seen in FIG. 1, the structural frame 121 approximates the curvature of the two trackways 81, 82. The structural frame 121 supports a pair of parallel belt conveyors 122, 123, which include a pair of continuous belts 124, 125 which are reeved around a pair of freely rotatable tail pulleys 126, 127 adjacent the rear frame 45 in vertical alignment with the splice plate 109, and a pair of head pulleys 128, 129 which are located adjacent the front frame 43. A separate motor 130 is operatively connected to each of the drive pulleys 128, 129 by means of a gear box 131 and timing belt 132 to drive or rotate the drive pulleys 128, 129 independently of each other but in synchronized relation with each other and the operation of the drive rolls 48 for rotating the spools or reels 27, 28 of the twin cassettes 20 in the let-off and take-up positions LP, TP.

A pair of sensing devices 133, 134, are used to independently monitor the movement of the conveyor belts 124, 125. Each of the sensing devices 133, 134 includes a wheel 135 for rolling engagement with the adjacent marginal edges 135, 137 of the conveyor belts 124, 125, and a digital counter 138 for sending impulses to a computer which controls operation of the drive motors 46, 130, and cutting device 160 to cut the sidewall stock 19, to length, when the let-off rolls, take-up rolls, and overhead conveyor 120 are brought to a standstill.

It should be apparent that the route traveled by the sidewall stock 19 from the let-off roll to the head pulleys 128, 129 is circuitous, but this is deliberately done to give the stock time to relax, i.e. cause within the stock the dissipation of stress which builds up internally within the stock during coiling of the stock on the cassettes. Thus, the travel of the stock to the rear of the frame and then back to the front is a deliberate effort to improve the quality of stock before application on the tire carcass.

Discharge Tray

Figure 6:
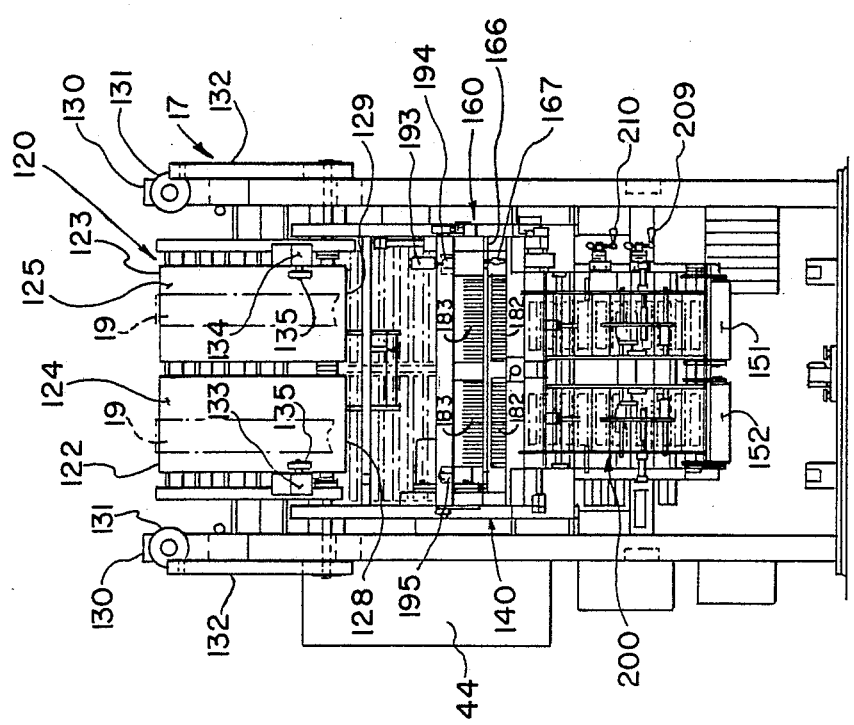
FIG. 6 is a front view of the servicer, as seen from the line 6—6 of FIG. 4.

With reference to FIGS. 4, 6, 10, there is shown the discharge tray 140 which has a proximal end 141 which is pivotally connected for rotation about the rotational axes of the head pulleys 128, 129 of the overhead conveyor 120. The opposing free distal end 142 of the discharge tray 140 is designed for rotation to and from the adjacent tire building drum 18 by means of a pneumatic or hydraulic cylinder assembly 143 which is designed to be fully stroked-out when the distal end 142 is properly positioned adjacent the drum 18. The position of the hydraulic cylinder assembly 143 is adjustable to accomodate differently sized drums 18. For example, the piston head 144 is pivotally coupled to the discharge tray 140 intermediate its opposing ends 141, 142, and the cylinder 145, is pivotally connected to an upstanding slidable bracket 146 which is threadable engaged with a horizontal drive screw 147 that is rotatably secured between a pair of vertically disposed lugs 148, 149 which, in turn, are welded to a plate 150 which is secured adjacent the front frame 43. Thus, by rotating the drive screw 147, the position of the hydraulic cylinder assembly 143 can be varied to correspondingly change the position of the free distal end 142 of the discharge tray 140.

A pair of applicator rolls 151, 152, freely rotatable about the same axis which is parallel to the rotational axis of the drum 18, are pivotally mounted at the free distal end 142 of the discharge tray 140 for limited rotation to and from the drum 18 to press sidewall stock 19 against the tire carcass on the drum 18 and stitch down the stock 19 as the drum 18 is rotated to wind the stock 19 onto the tire carcass being built on the drum 18. A small pneumatic or hydraulic cylinder 153 is provided to rotate the applicator rolls 151, 152, in unison, when the sidewall stock is ready to be applied to the tire building drum 18. The discharge tray 140 carries the final aligning mechanism 200 which is located just upstream from the applicator rolls 151, 152, and the cutting device 160 which is further upstream.

Cutting Device

With reference to FIGS. 4, 6, 10-13, there is shown the cutting device 160 which comprises a carrier 161 which is slidably mounted on at least one guide rod 162 (FIG. 11) which is secured longitudinally of the tray 140. The bottom portion 163 of the carrier 161 extending below the tray 140, is threadably engaged with a drive screw 164 which is secured to the tray 140 in parallel relation with the smooth guide rod 162. A handle 165, located at the side of the tray 140, is provided to rotate the drive screw 164 to reciprocate the carrier 161 on the guider rod 162 longitudinally of the tray 140. The carrier 161 carries a cutting anvil 166, which extends normally across the tray 140, and a cutter 167 (FIG. 12) which is angularly mounted above the anvil 166 and movable along the anvil to cut the pieces of whitewall and blackwall stock 19.

A conveyor 168, composed of rows of freely rotatable rollers, e.g. roller 169, which are generally coextensive with the anvil 166, is mounted on the carrier 161 for unitary movement with the anvil 166 and cutter 167. The conveyor 168 extends upstream and downstream of the anvil 166 to support the sidewall stock 19 adjacent the anvil 166 during the cutting operation. The rollers 16, of the support conveyor 168 are linked to at least one drive chain 170 which is reeved around a number of sprocket wheels 171-174 which are mounted on the tray 140 for rotating freely about parallel axes which are parallel to the rotational axis of the applicator rolls 151, 152. The support conveyor 168, as seen in Fig, 12, has a limited length which corresponds to its limited travel longitudinally of the tray 140. Moreover, the sprocket wheels 171-174 are located, such that the drive chain 170 and attached rollers 169 of the support conveyor 168, move along a trapizodal pathway between a fully retracted position where the anvil 166 is closest the applicator rolls 151, 152, to a fully extended position where the anvil 166, shown in dotted line, is farthest from the applicator rolls 151, 152.

The three rollers 175-177 of the support conveyor 168, immediately downstream of the anvil 166, are spring-loaded as a unit upwardly towards the sidewall stock 19, to insure that the knife 178 of the cutter 167 moves along the sloped head or top face 179 of the anvil 166, as the cutter 167 moves transversely of the tray 140 to angularly cut the pieces of sidewall stock 19 resting on the anvil 166.

The discharge tray 140 includes a second downstream conveyor 180 which has fixed rows of laterally oriented freely rotatable rollers between the applicator rolls 151, 152 and the upstream movable conveyor 168 of the cutting device 160. Note in FIG. 13 that the rollers of the first row 181 of rollers of the fixed conveyor 180 immediately downstream of the movable conveyor 168 are designed to mesh between the rollers of the movable conveyor 168 to insure that the pieces of sidewall stock 19 move smoothly from the movable support conveyor 168 onto the adjacent fixed conveyor 180 of the discharge tray 140.

Figure 5:
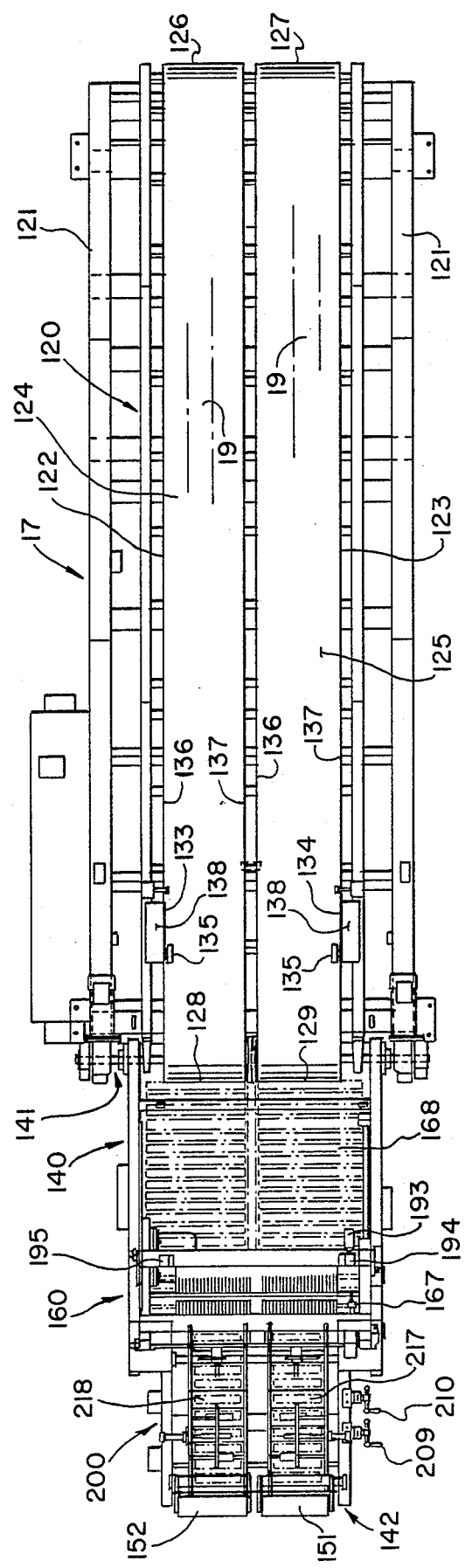
FIG. 5 is a plan view of the servicer, as seen from the line 5—5 of FIG. 4.
Figure 12:
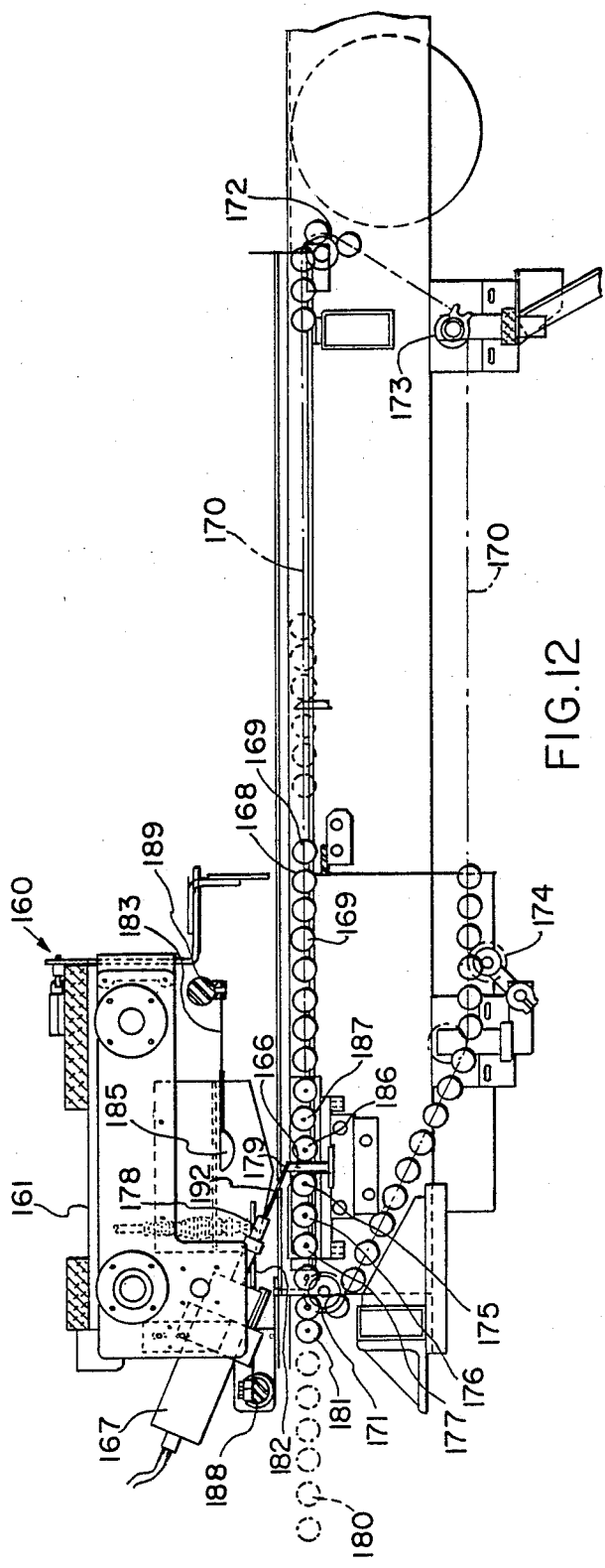
FIG. 12 is a section of the tray viewed from the line 12—12 of FIG. 10.
Figure 13:
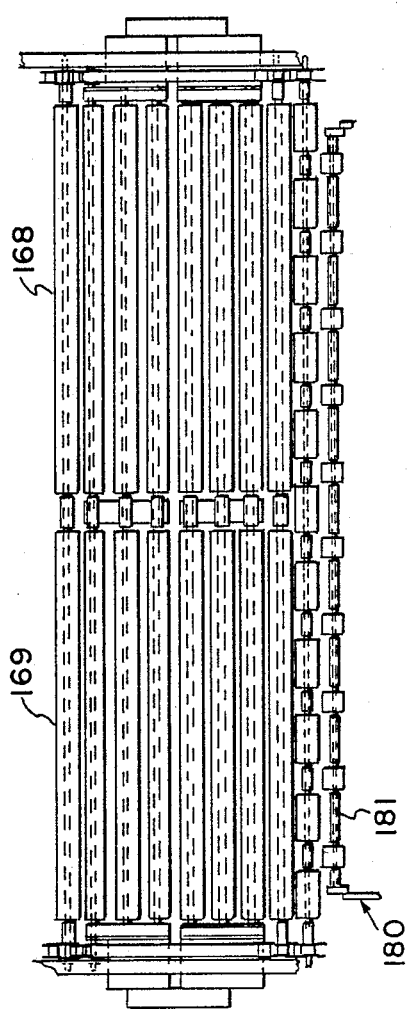
FIG. 13 is a plan view of a portion of the tray designed to show the juncture of the conveyer and stock cutting assembly with the adjacent fixed roller conveyor of the tray.
Figure 14:
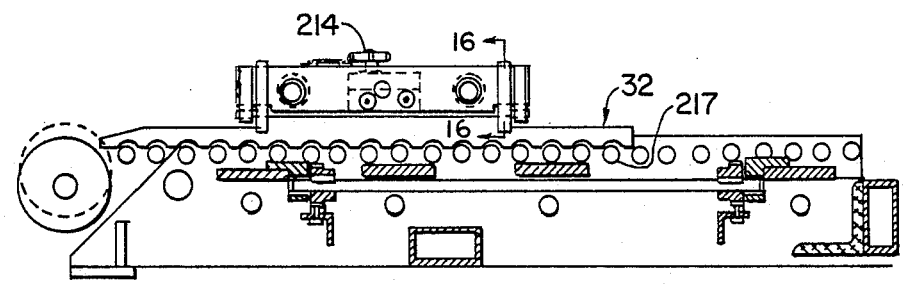
FIG. 14 is a section of the final aligning device of the tray, as seen from the line 14—14 of FIG. 10.
Figure 15:
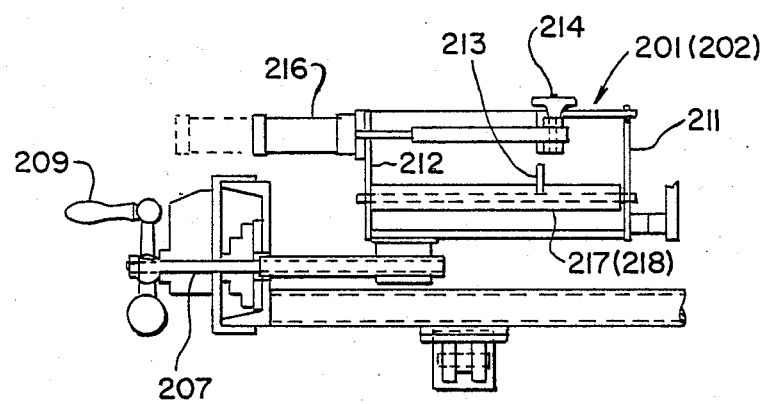
FIG. 15 is a section of the final aligning device of the tray, as seen from the line 15—15 of FIG. 10.
Figure 16:
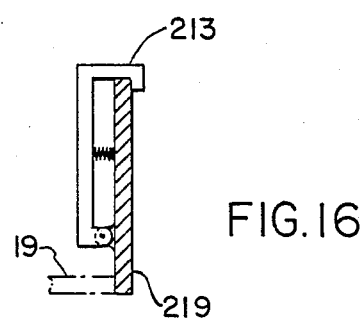
FIG. 16 is a section of the spring-loaded guide bar of the final aligning device of the tray, as seen from the line 16—16 of FIG. 14.

A pair of clamps 182, 183 are provided to clamp each of the two pieces of sidewall stock 19 firmly against the rollers of the movable conveyor 168 downstream and upstream of the cutting anvil 166, when the servicer 17 is stopped for cutting the sidewall stock 19. The clamps 182, 183, as best seen in FIGS. 5, 6, and 10, are similar and comprise a planar material which is cut to form a number of fingers, e.g. finger 184, in side-by-side relation for engaging the uneven cross-sectioned shapes of the two pieces of sidewall stock 19. As seen in FIG. 12, the fingers 184 of the upstream clamps 183, are each provided with a downwardly extending circular segment 185 for pressing the two pieces of sidewall stock 19 downwardly in correspondingly curved relation between the two rows 186, 187 of rollers immediately upstream of the cutting anvil 166 to place the two pieces of sidewall stock 19 over the head 179 of the anvil 166 in upwardly curved, concave relation where the upper surface of the stock is in tension, so that the cut in the sidewall stock 19 will remain open and not close as the knife 178 moves in cutting relation along the anvil 166. The clamps 182, 183 are fastened to transversely extending parallel bars 188, 189 which are rotatably mounted on the carier 161 and coupled to hydraulic or pneumatic cylinders 190, 191 which are also rotatably mounted on the carrier 161 for rotating the bars 188, 189 and attached clamps 182, 183 into and out of clamping engagement with the two pieces of sidewall stock 19.

The cutter 167 includes an ultrasonically vibrated cutting knife 178 which has a relatively flat blade 192 with opposing sharp edges for cutting the unvulcanized rubber sidewall stock 19 as the knife 178 moves laterally across the stock in either direction. A sensor 193 is provided for moving laterally, in unison, with the ultrasonic knife 178 to sense the presence of stock 19. The ultrasonic knife 178 is set at an appropriate speed, depending on the thickness of the stock being cut. The thicker the stock, the slower the ultrasonic knife 178 moves laterally. The ultrasonic knife 178 is detachably mounted on the carrier 161 in angular relation, so that the twin edge blade 192 of the knife 178 will rest in parallel relation atop the sloped head 179 of the cutting anvil 166. Also, the knife 178 can be easily removed for replacement of a dull cutting blade 192. The included angle between the cutting plane and the plane of the support conveyor 168, measured downstream of the anvil 166, is an acute angle.

A pair of limit switches 194, 195 are provided beyond opposing ends of the clamps 183 (FIG. 10) to limit travel of the cutter 167 and the sensor 193 which is designed to engage the limit switches 194, 195 to start and stop lateral movement of the cutter 167. Thus, each cutting operation will involve movement of the knife 178 laterally in one direction only. There is no return of the knife to a rest position upon completion of the cut as is the case in many cutting operations.

Final Aligning Mechanism

With reference to FIGS. 4–6, 10, and 14–16, there is shown the final aligning mechanism 200 which is designed to finally adjust the positions of the two pieces of sidewall stock 19 for application on the tire building drum 18. The final aligning device 200 comprises a pair of carriages 201,202 which are positioned for moving laterally between opposing ends of the fixed conveyor 180 just upstream from the applicator rolls 151, 152. The carriages 201, 202 are slidably mounted on axially aligned, laterally oriented pairs of guide rods 203, 204 and 205, 206 and threadably coupled to separate, but parallel, drive screws 207, 208 which are parallel to the guide rods and manually rotated by means of handles 209, 210 which are accessible adjacent the discharge tray 140 on the same side of the tray that the handle 165 for moving the cutter carrier 161 is located.

Each of the carriages 201, 202, carry a fixed inner guide plate 211 and a parallel fixed outer plate 212 which is parallel to the centerline of the discharge tray 140. A third, shorter guide plate 213 is mounted on each of the carriages 201, 202 between and in parallel relation with, the inner and outer guide plates 211, 212. The intermediate guide plate 213 is movable to and from the outer guide plate 212 to vary the spacing between them to accomodate sidewall stock of different widths, since the stock is passed between the outer guide plate 212 and the intermediate guide plate 213. For example, a manually operated handle 214 is used to adjust the position of the intermediate guide plate 214 on the piston rod 215 of a hydraulic or pneumatic cylinder 216 which is associated with each of the carriages 201, 202.

A plurality of freely rotatable rollers 217, 218 are below each of the carriages 201, 202 for supporting the sidewall stock 19, as it passes through the carriages 201, 202 between the outer and intermediate guide plates 212, 213.

The intermediate guide plates 213 are each C-shaped and include a flat plate 219 which is spring-loaded in the direction of the outer plates 212 to accomodate any slight variations in the width of the sidewall stock 19, as the stock passes between the outer guide plate 212 and the spring-loaded intermediate plate 219.

In operation, assuming the servicer 17 is properly positioned in respect to the tire building drum 18, and the unvulcanized tire carcass on the tire building drum 18 is ready to receive the strips of sidewall, and the twin cassette in the let-off position LP is loaded with separate reels or spools 27, 28 of unvulcanized whitewall and blackwall stock 19, and an empty cassette 20 is in the take-up position TP, the operator operates the let-off motors 48 to rotate the leading edges 37 of the liners 31 into engagement with the waiting jaws 88, 89 of the robotic grabbers 80 which are activated to move the leading edges 37 to the rear of the servicer 17. The operator grabs the leading edges 37 with the first fastener part and moves the edges into interlocking engagement with the cores 29 that are wrapped with the second part of the two part fastener. When the two pieces of sidewall stock appear, the operator forms them into festooning loops 92 and threads them through the initial aligning deice 100 onto the overhead conveyor 120 for passage to the discharge tray 140 which has been rotated into position adjacent the tire building drum 18, as seen in FIG. 4. When the operator sees that the leading edges 37 are over the cutting anvil 166, the servicer 17 is stopped and the cutting device 160 activated to cut the leading edges 37. The servicer 17 can then be oeprated in the automatic mode.

The separate systems for supplying whitewall and blackwall stock 19 are independently operated until the digital sensors 134, 133, associated with the systems, trigger a shut down of the systems to cut the pieces of stock, to length, after which the applicator rolls 151, 152, are rotated toward the drum 18 to press the properly aligned whitewall and blackwall stock 19 onto the tire carcass. The drum 81 is then rotated to pull the stock 19 from the discharge tray 140 and wrap it on the tire carcass. The hydraulic cylinder 143 is then inactivated to rotate the discharge tray 140 from its extended position back to its retracted position against the front frame 43 of the servicer 17. The operator then steps onto the safety mat 42 and continues building the unvulcanized tire carcass. Upon completion, the unvulcanized carcass is removed from the drum and subsequently molded and vulcanized.

While the unvulcanized carcass is being completed on the drum, the servicer is operated in the auotmatic mode to feed and cut, to length, the next two strips of sidewall stock 19 which are held on the discharge tray 140 by the clamp 182 that is downstream of the cutting anvil 166, until such time as the strips are ready for application on the next unvulcanized tire carcass being built on the drum. Thus, no time is lost in the measuring and cutting of the strips of sidewall stock 19. The servicer 17 is continuously operated in the automatic mode until the let-off roll is emptied of stock and liner, at which time the automatic mode must be discontinued, until the cassettes 20 in the standby, let-off, and take-up positions SP, LP, TP, can be shifted around and the leading edge of the new stock spliced to the trailing edge of the old stock at the splice plate 109.

Thus, there has been described a fully automated machine for immediately applying cut-to-length pieces of sidewall stock without handling by an operator which can adversely affect the shape and length of the stock. Another advantage of the machine is the use of the ultrasonic twin-edged knife which does not mar the whitewall stock and saves time by cutting in either direction which does not necessitate returning the knife to rest position after the cut is made.

What is claimed is:

1. A servicer for supplying a cut-to-length strip of unvulcanized rubber tire building material to a tire building drum, comprising:
    (a) a rigid framework mountable on a generally horizontal surface adjacent a tire building drum which is rotatable about a fixed axis;
    (b) a first roll mounted within the framework in a let-off position for rotation about an axis which is parallel to the rotational axis of the drum, the first roll having spirally wrapped thereon, a continuous strip of unvulcanized rubber tire building material separated by a protective liner;
    (c) a second roll mounted within the framework in a take-up position for rotation about an axis which is parallel to the rotational axis of the drum, the second take-up being empty and in aligned, liner receiving relation with the first let-off roll (d) means for rotating the rolls in synchronized relation;

(e) means coacting with the rolls for moving them to and from the let-off and take-up positions and for clamping them firmly in said positions;

(f) means for moving a strip of material, separated from the liner adjacent the second take-up roll, along a pathway in synchronized relation with the rotation of the rolls, the pathway being of sufficient length to cause at least partial relaxation of stress built-up in the material during wrapping of the material on the first let-off roll, the pathway terminating at a point which is vertically above the rolls at the front of the framework closest the drum;

(g) a discharge tray aligned with the pathway for receiving material therefrom, the tray having a proximal end pivotally mounted adjacent the termination of the pathway and a free distal end which is longitudinally spaced from the proximal end;

(h) means for rotating the distal end of the tray from a retracted position adjacent the framework to an extended position adjacent the drum;

(i) at least one applicator roll mounted adjacent the distal end of the tray for rotating freely about an axis which is parallel to the rotational axis of the drum;

(j) means mounting the applicator roll on the tray for rotation to and from the drum when the distal end of the tray is adjacent the drum;

(k) means carried by the tray between the ends thereof for cutting material on the tray, including (I) an ultrasonic cutter which is angularly disposed to the plane of the tray to cut the material crosswise at an angle, the included angle between the intersecting planes of the tray and angular cut, measured downstream of the cutter, relative to the movement of the material on the tray, being an acute angle, (II) a cutting anvil extending normally of the tray, thematerial generally resting against the anvil during the cutting thereof, the anvil having a sloped head closest the material, the slope of the head being similar to the angular disposition of the cutter, (III) laterally extending rows of freely rotatable rollers upstream and downstream of the anvil for supporting the material immediately upstream and downstream of the anvil, and (IV) means mounting the cutter, anvil, and rows of rollers immediately upstream and downstream of the anvil, for unitary limited movement longitudinally of the tray;

(l) means carried by the tray between the cutter and applicator roll for finally aligning cut-to-length material on the tray for discharge therefrom to the drum; and (m) a sensor for monitoring movement of material on the servicer and stopping movement of thematerial at least on the tray and pathway for a period sufficient to cut the material to length and discharge the cut material from the tray, when the sensor decides that the material downstream of the cutter is of the desired length for cutting.

2. The servicer of claim 1, wherein the liner is U-shpaed and comprises, (I) a planar web which is composed of material to which unvulcanized rubbery material will not stick, the web having a pair of opposing parallel marginal edges and being sufficiently strong to support the strip of unvulcanized rubbery material placed thereon, and (II) a pair of similarly sized projections extending from the marginal edges in the same direction from the web, the thickness of the projections, measured from the web, being greater than a correspondingly measured thickness of the strip of unvulcanized material suitable for building a tire.

3. The servicer of claim 2, wherein the material cutting means (K) includes, (i) a cutter with a double edge knife blade for cutting material in either direction as the cutter moves along the anvil, (ii) means for clamping the material to the rollers immediately upstream and downstream of the anvil in such a way as to place the outer surface of the material farthest from the sloped head of the anvil in tension, so that the cut will remain open and not close during as the knife blade of the cutter moves along the top head of the anvil; and (iii) means for reciprocating the cutter and anvil, and said rolls coupled therewith, longitudinally of the tray to vary the length of the material being cut.

4. The servicer of claim 3, which includes:
(n) means for shifting a roll filled with liner and unvulcanized rubbery material from, (I) a standby position, adjacent the let-off position, to the let-off position where the roll is emptied of liner and material, (II) a let-off position to a take-up position where the empty roll is filled with liner, and (III) a take-up position to a removal position, adjacent the take-up position, where a roll filled with liner is removed from the servicer; and (o) means for clamping a roll firmly, in place, in the let-off and take-up positions.

5. The servicer of claim 4, which includes:
(p) means for automatically grabbing the leading edge of liner first to leave a roll in the let-off position, and carrying such edge to the roll in the take-up position where an operator takes the edge and threads it on the roll in the take-up position for wrapping thereon.

6. The servicer of claim 5, wherein the grabbing means (p) includes:
(I) at least one fixed trackway disposed in overhead relation above rolls in the let-off and take-up positions, the trackway having opposing ends which extend beyond the rotational axes of the rolls;

(II) a trolley movable along the trackway;

(III) a pair of jaws pivotally mounted to the trolley and rotatable from a first position to grasp the leading edge of liner to a second position to let go of the leading edge, as the trolley moves along the trackway;

(IV) a first sensor between the jaws for operating the trolley, when the leading edge of liner contacts the sensor between the jaws in the first position, and a second sensor for stopping operation of the trolley when the jaws are in the second position.

7. The servicer of claim 6, wherein the final material aligning means (e) includes:
(I) a pair of guide plates which extend in parallel relation longitudinally of the tray;

(II) means for moving the guide plates, in unison, laterally across the tray to vary the position of the quide plates thereon;

(III) means for moving one of the guide plates relative to the other guide plate to vary the spacing between them to accomodate different width strips of unvulcanized rubbery material; and (IV) means for spring-loading the one relatively movable guide in the direction of the other guide to accomodate slight variations in the width of the strip.

8. A servicer for supplying two cut strips of unvulcanized sidewall stock simultaneously to a tire building drum for application on an unvulcanized tire carcass being built on the drum, comprising:
(a) a rigid framework secured on a horizontal surface in aligned relation with an adjacent drum, the framework having a front end closest the drum and a rear end farther spaced from the drum
(b) an indexing table disposed between the front and rear ends of the framework for supporting a pair of let-off rolls which are each filled with a continuous strip of unvulcanized sidewall stock which is spirally wrapped on the roll and separated by a protective liner, and a pair of take-up rolls which are emptied of stock and liner and which are in aligned, liner receiving relation with the let-off rolls, the let-off and take-up rolls being rotatable about axes which are parallel to the rotational axis of the drum, the let-off rolls being closer the front of the framework and the take-up rolls being closer the rear of the framework;
(c) means coacting with the table for at least automatically moving the let-off rolls, emptied of stock and liner, from let-off positions on the table to take-up positions on the table, including means for clamping the rolls firmly, in place, in the let-off and take-up positions;
(d) means mounted on the framework in overhead relation above the letoff and take-up rolls on the indexing table, for automatically grabbing leading edges of liner first to leave the let-off rolls, and moving the edges to a point adjacent the rear of the framework where an operator of the servicer can take the edges and thread them onto the take-up rolls;
(e) a pair of conveyors disposed in parallel relation between the front and rear ends of the framework in overhead relation above the automatic liner grabbing means (d), the conveyors each having a continuous belt which is driven to move stock a distance from the rear of the framework to the front of the framework sufficient to relax the stock by a least partially eliminating stress built-up in the stock during the wrapping of the stock and liner on the let-off rolls;
(f) means disposed at the rear of the framework for initially aligning the strips of stock for subsequent passage on the overhead conveyors;
(g) means coacting with the rolls in the let-off and take-up positions for rotating the rolls in synchronized relation;
(h) means coacting with the overhead conveyors for moving the continuous belts in synchronized relation with each other and the rotation of the rolls in the let-off and take-up positions;
(i) a discharge tray disposed adjacent the front of the framework in aligned, stock receiving relation with the belts of the overhead conveyors, the tray having (i) a proximal end which is pivotally mounted adjacent ends of the overhead conveyors terminating at the front end of the framework, and (ii) a free distal end which is longitudinally spaced from the proximal end and which is rotatable from a retracted position adjacent the front end of the framework to an extended position in aligned, closely spaced relation from the drum;
(j) a pair of applicator rolls mounted in end-to-end relation adjacent the distal end of the tray for rotating freely about a common axis which is parallel to the rotational axis of the drum;
(k) means for rotating the applicator rolls into and out of engagement with the closely spaced drum to press cut strips of sidewall stock against the unvulcanized tire carcass being built on the drum;
(l) means mounted on the tray between the ends of the tray for cutting the two pieces of sidewall stock along a plane which is inclined to the plane of the tray, the included angle between such intersecting planes, meaured downstream of the cut, relative to movement of the stock on the tray, being an acute angle;
(m) final aligning means mounted on the tray between the applicator rolls and the stock cutting means (e) for aligning the cut strips of stock on the tray for discharge therefrom; and
(n) a pair of sensors coacting with the overhead conveyors for monitoring movement of the belts and, (i) stopping movement of at least the belts, and (ii) cutting the stock, when sensed movement of the belts, correlated to the length of the stock downstream beyond the cutting plane, indicates that the stock is of the desired length for cutting.

9. The servicer of claim 8, wherein the stock cutting means (l) includes:
(I) a cutting anvil extending laterally of the tray at right angles to the longitudinal axis of the tray, the anvil having a sloped head against which stock rests;
(II) a support conveyor for supporting the stock upstream and downstream of the anvil a predetermined distance, the conveyor including rows of freely rotatable rollers which are parallel to the anvil;
(III) an ultrasonic cutter having a double-edged knife blade for cutting stock as the blade moves in inclined relation along the sloped head of the anvil in either direction across the tray;
(IV) means mounting the cutter, anvil, and support conveyor for unitary limited movement longitudinally of the tray to cut stock of different lengths;
(V) means for reciprocating the cutter, anvil, and support conveyor longitudinally of the tray;
(VI) a sensor movable, in unison, with the cutter laterally across the tray for sensing the cross-sectional contour of the strips of stock and varying the speed at which the cutter travels along the anvil in correlated relation to the thickness of the stock being sensed;
(VII) means for clamping the strips of stock against the support conveyor immediately upstream and downstream of the anvil, including a number of individual fingers in side-by-side relation for compressively engaging the stock; and
(VIII) means at the distal ends of the upstream clamps closest the stock, for placing the top surfaces of stock farthest from the top head of the anvil in tension so that the cut will open and not close as the cutter moves along the anvil in cutting relation with the stock.

10. The servicer of claim 8, wherein the aligning means includes:
(I) a pair of parallel guide plates which extend longitudinally of the tray for guiding each of the two pieces of sidewall stock, the two pairs of guide plates being in laterally aligned relation across the tray;

(II) means for reciprocating the guide plates of each pair of plates, in unison, a limited distance laterally of the tray, said means including means for reciprocating the two pairs of guide plates independently of each other;

(III) means for moving one of the guide plates of each pair of guide plates to vary the spacing between the guide plates of each pair; and (IV) means for spring-loading one of the guide plates of each pair of guide plates to accommodate slight variations in widths of the stock.

11. The servicer of claim 8, wherein the means (d) for grabbing the leading edges of liner on the let-off rolls, includes:

(I) a pair of similar trackways mounted on the framework in overhead relation above rolls in the let-off and take-up positions, the trackways extending from the let-off roll position to a point beyond the take-up roll position;

(II) a trolley movable along each of the trackways;

(III) a pair of jaws pivotally mounted on each of the trollyes for grabbing and holding the leading edges of the liners;

(IV) means mounting each pair of jaws for rotation from a leading edge pickup position to a release position for letting go of the edges, as the trolleys move along the trackways; and (V) means coacting with the jaws for moving the trolleys from the pickup positions to the release positions, when the leading edges of the liners become engaged in the jaws.

12. The servicer of claim 8, wherein the indexing table, includes (I) a standby position where a full roll of stock, separated by liner, is positioned, prior to entry into the let-off position, the standby position, including:
 (i) at least one conveyor of freely rotatable rollers on which the roll is supported in the standby position, the conveyor extending to the let-off position, and
 (ii) means for moving a roll on the conveyors in the standby position to the let-off position;

(II) a let-off position where a roll, loaded with stock and liner, is placed for removal; the let-off position, including;
 (i) a number of similar, freely rotatable multi-directional ball transfers for rollingly supporting the roll in the let-off position, the ball transfers extending to the take-up position;
 (ii) means for clamping and unclamping a roll in the let-off position; and
 (iii) means for moving a spent roll from which stock and liner have been removed, from the let-off position to a take-up position;

(III) a take-up position where a spent roll is placed for wrapping liner, separated from stock, thereon, the take-up position, including:
 (i) a number of similar, freely rotatable multi-directional ball transfers for rollingly supporting a spent roll in the take-up position, the ball transfers extending to the removal position;
 (ii) means for clamping and unclamping a roll in the take-up position; and
 (iii) means for moving a roll, loaded with liner, from the take-up position to a removal position;

(IV) a removal position where a roll, loaded with liner, is placed for removal from the servicer, the removal position, including:
 (i) at least one conveyor of freely rotatable rollers on which the roll is supported in the removal position, the conveyor extending to the take-up position; and
 (ii) means for moving a roll on the ball transfers in the take-up position, onto the conveyor in the removal position.

13. The servicer of claim 8, which includes:

(n) a splice plate vertically disposed in aligned relation with the initially stock aligning means (f), against which a leading edge of a new roll can be spliced to a trailing edge of a spent roll.

14. The servicer of claim 8, which includes:

(o) means for varying the position of the distal end of the discharge tray to accomodate the use of different diameter tire building drums.

15. The servicer of claim 8, which includes a let-off roll which comprises:

(I) a rectangular base;

(II) a plurality of stanchions extending in parallel relation from the base;

(III) a pair of spools mounted on the stanchions for rotation about a common axis.

16. The servicer of claim 8, which includes a liner which is U-shaped and comprises a planar web with parallel marginal edges, and a pair of similarly sized projections at the marginal edges and extending from the web in the same direction, the thickness of the projections, measured from the web, being greater than the thickness of the sidewall stock, the web being composed of material to which unvulcanized rubber sidewall will not stick and being rigid compared to the projections.

17. The servicer of claim 16, wherein the web is composed of polyvinylchloride.

18. A servicer for supplying two cut-to-length strips of unvulcanized sidewall stock simultaneously to tire building drum for application to an unvulcanized tire carcass being built on the drum, comprising:

(a) a twin cassette having a rectangular base with a plurality of upstanding stanchions which extend in parallel relation from the base, at least one of the stanchions separating a pair of spools which are mounted on the stanchions for rotating freely in parallel planes about a common axis;

(b) a liner for protecting stock which is spirally wrapped on each of the spools, the liner being U-shaped and having (i) a planar web which is sufficiently rigid to support the stock thereon and which has a pair of parallel marginal edges and which is composed of material to which unvulcanized sidewall stock will not stick, and (ii) a pair of similar projections extending in the same direction from the marginal edges of the web, the projections having a thickness, measured from the web, which is greater than a correspondingly measured thickness of said stock suitable for building a tire, (c) a framework fastened on a horizontal surface adjacent a tire building drum in aligned relation with the drum, the framework having a front end closest the drum and a rear end another spaced from the drum than the front end;

(d) a stationary, rectangular indexing table disposed between the ends of the framework for supporting twin cassettes in four positions; namely, (i) a standby position where a twin cassette loaded with stock separated by liner, awaits placement in the servicer, (ii) a let-off position adjacent the front of the framework where a loaded twin cassette pays out two continuous pieces of stock which are supported on similar liners; (iii) a take-up position, adjacent the rear of the framework, where an empty twin cassette, free of stock and liner, receives liner, separate from the stock, for winding on the spools, and (iiii) a removal position where a twin cassette, loaded with liner, is placed for removal from the servicer to the table including:

(I) at least one pair of conveyors with freely rotatable rollers on which a twin cassette is supported in the standby and removal position, the longitudinal axis of the conveyors being normal to the longitudinal axis of the framework between the front and rear thereof;

(II) a number of multi-directional, freely rotatable ball tranfers on which a twin cassette is supported in the let-off and take-up positions in the same plane that the twin cassette is supported in the stand-by and removal positions;

(III) means for clamping twin cassettes in aligned relation in the let-off and take-up positions, such that the spools thereof will rotate about axes which are parallel to the axis about which the tire building drum rotates;

(IV) means for sequentially moving cassettes from, (i) the take-up position to the removal position, (ii) the let-off position to the take-up position, (iii) the standby position to the let-off position;

(e) a robotic grabber for taking the leading edges of the liners first to leave the spools of a twin cassette in the let-off position, and moving such edges to the rear of the framework for receipt by an operator, the robotic grabber including;

(I) a pair of similar trackways disposed on the framework in overhead relation above twin cassettes in the let-off and take-up positions, the opposing ends of the trackways extending beyond the rotational axes of the twin cassettes in these positions, the trackways being generally curved outwardly away from the indexing table;

(II) a pair of trolleys with wheels that rollingly engage in trackways;

(III) a pair of jaws pivotally mounted on each of the trolleys for receiving and grasping the leading edges of the liners;

(IV) means for rotating the jaws from a liner receiving position adjacent a twin cassette in the let-off position to an angularly opposed, liner let-go position beyond a twin cassette in the take-up position, as the trolleys move between these positions;

(V) means fro moving the trolleys between the liner receiving and let-go positions;

(VI) a first sensor between the jaws of each trolley for activating operation of the trolley moving means when the leading edges of the liners are firmly grasped by the jaws;

(VII) a second sensor for stopping movement of the trolleys when the jaws are in the let-go position;

(f) means for separately rotating each of the spools of twin cassettes in the let-off and take-up positions in synchronized relation;

(g) a pair of parallel, belt-type conveyors mounted on the framework in overhead relation above the trackway of the robotic grabber, the conveyors being generally curved outwardly away from the trackway of the robotic grabber, each of the conveyors including:

(I) a head pulley at the front end of the framework and a freely rotatable tail pulley at the rear end of the framework;

(II) a continuous belt to which unvulcanized sidewall stock will not stick, reeved around and between the head and tail pulleys;

(III) means for separately rotating the head pulleys in synchronized relation with each other and with the rotation of spools of the twin cassettes in the let-off and take-up positions, to drive the overhead conveyors in synchronized relation with the paying out of liner and stock and the winding-up of liner;

(IV) means for sensory movement of each of the belts and stopping operation of the belts and spools to cut the two pieces of stock to length when predetermined movement of the belts, correlated to the desired length of the stock, is sensed;

(h) means disposed at the rear end of the framework in generally vertical alignment with the tail pulleys of the overhead conveyors, for initially aligning pieces of stock for passage onto the overhead conveyors;

(i) a discharge tray extending from the front end of the framework in aligned relation with the overhead conveyors for receiving stock therefrom, the discharge tray having a proximal end which is pivotally mounted adjacent the head pulleys of the overhead conveyors, and a free distal end which is longitudinally spaced from the proximal end;

(j) means for rotating the free distal end of the discharge tray to and from the tire building drum, the tray being rotated from a retracted, generally vertical position adjacent the front end of the framework to an extended position where the tray slopes from the head pulleys angularly downwardly towards the drum and the distal end is closely spaced to the adjacent lower portion of the drum relative to the horizontal surface on which the drum and framework are mounted;

(k) a pair of applicator rolls disposed in end-to-end relation at the distal end of the tray, and being freely rotatable about a common axis which parallels the rotational axis of the drum;

(l) means for rotating the applicator rolls to and from the drum when the tray is in an extended position to press stock against the tire carcass on the drum and stitch down the stock on the tire carcass when the drum is rotated to pull the stock from the tray and wind it onto the tire carcass;

(m) means carried by the tray immediately upstream of the applicator rolls, relative to the movement of stock on the tray, for finally aligning the stock for transfer to the tire carcass, including:

(I) two pairs of guide plates in side-by-side laterally aligned relation across the tray, the guide plates being parallel and extending longitudinally of the tray;

(II) means for separately adjusting the lateral positions of each pair of guide plates independently of each other to vary the alignment of each piece of sidewall stock;

(III) means for varying the spacing between the guide plates of each pair of guide plates to accommodate stock of different widths; and (IV) means for spring-loading one of the guide plates of each pair of guide plates to accommodate slight variations in the width of each piece of stock;

(n) a cutting mechanism disposed on the tray upstream from the final stock aligning means (m) for cutting the pieces of stock, including:

(I) a cutting anvil extending laterally across the tray at right angles to the longitudinal axis of the tray, the anvil having a sloped head against which stock rests and the cut is made;

(II) a support conveyor having rows of freely rotatable rollers which parallel the anvil and which are upstream and downstream of the anvil for supporting stock as it moves to and from the anvil;

(III) an ultrasonic cutter poised vertically above the anvil and rows of rollers when the tray is disposed in a horizontal position, the cutter including a double-edged knife blade which is inclined to move along the sloped head of the anvil and cut stock as the knife blade moves in either direction across the tray, the plane of the cut and sloped head of the anvil diverging from the plane of the tray in a direction downstream of the anvil, the included angle between the planes of the cut and the tray being an acute angle when measure downstream of the anvil;

(IV) mean mounting the anvil, support conveyor, and the ultrasonic cutter for unitary limited reciprocating movement longitudinally of the tray to cut stock of different lengths;

(V) means for clamping the stock against the rollers immediately upstream and downstream of the anvil; and (VI) means sensing the contour of the stock and varying the speed at which the cutter moves along the anvil in correlated relation to the thickness of the stock.

19. The servicer of claim 18, wherein the web of the liner is composed of polyvinylchloride with a textured stock engaging surface to which the stock will not adhere, and the projections are composed of elastomeric material.

20. The servicer of claim 19, which includes means for spring-loading the three rows of rollers, immediately downstream of the anvil, as a unit upwardly in the direction of the overhead cutter.

21. The servicer of claim 20, wherein the stock clamping means (n-V) includes a plurality of fingers which are in side-by-side aligned relation for adapting to a variable contour of the stock, the fingers of the clamps upstream from the anvil having circular segments for pressing stock between the rollers of adjacent rows of rollers.

22. The servicer of claim 21, which includes a carrier for carrying the cutter, cutting anvil and attached rows of rollers upstream and downstream of the anvil, and the unitary moving means (n-IV) includes, (i) at least one guide rod and a drive screw which extend in parallel relation longitudinally of the tray, (ii) means for slidably mounting the carrier on the guide rod for movement therealong, (iii) means for threadably engaging the carrier with the drive screw for movement therealong when the screw is rotated, and (iiii) a manually operated handle connected to the drive screw for rotating the screw in either direction.

23. The servicer of claim 22, which includes a separate carriage for carrying each pair of guide plates, and the means (m-II) for separately adjusting the lateral position of each pair of guide plate includes, (i) at least one guide rod which extends normally across the tray, (ii) means for slidably mounting the carriages for reciprocating movement along the guide rod, (iii) a separate drive screw for each carriage extending at least partially across the tray in parallel relation with the guide rod, (iiii) means for threadably mounting the carriages on separate drive screws for movement therealong when the screws are rotated; and (iiiii) a manually operated handle connected to each drive screw for rotating the screws.

24. A protective U-shaped liner in which unvulcanized rubbery material can be placed for spiral wrapping in a roll, comprising:

(a) a planar web which is composed of a of a material having sufficient rigidity to support said unvulcanized rubbing material and a surface to which unvulcanized rubbery material will not stick; the web having a pair of parallel marginal edges; and (b) a pair of similarly sized projections of of an elastic material having greater compressibility than the material of said web extending from the marginal edges of the web in the same direction, the thickness of the projections, measured from the web, being greater than the correspondingly measured thickness of a piece of unvulcanized rubbery material for which the liner is designed to protect.

25. The liner of claim 24, wherein the web is composed of polyvinylchloride with a textured stock engaging surface to which the unvulcanized rubbery material will not adhere.

* * * * *